United States Patent [19]

Mercer

[11] Patent Number: 4,662,946

[45] Date of Patent: May 5, 1987

[54] STRENGTHENING A MATRIX

[76] Inventor: Frank B. Mercer, Kenolbri, Meins Road, Blackburn, Lancashire, England

[21] Appl. No.: 615,796

[22] Filed: May 31, 1984

Related U.S. Application Data

[63] Continuation-in-part of Ser. No. 538,421, Oct. 3, 1983, abandoned.

[30] Foreign Application Priority Data

| Oct. 5, 1982 | [GB] | United Kingdom | 8228334 |
| Mar. 31, 1983 | [GB] | United Kingdom | 8308915 |
| Jun. 3, 1983 | [GB] | United Kingdom | 8315289 |
| Jun. 15, 1983 | [GB] | United Kingdom | 8316335 |
| Jun. 28, 1983 | [GB] | United Kingdom | 8317491 |
| Dec. 21, 1983 | [GB] | United Kingdom | 8333999 |
| Dec. 23, 1983 | [GB] | United Kingdom | 8334458 |

[51] Int. Cl.⁴ .................. C08L 95/00; E02D 3/00; E01C 21/00
[52] U.S. Cl. .................. 106/281 R; 106/900; 405/258; 428/134; 524/3
[58] Field of Search .......... 106/900, 281; 428/703, 428/134; 405/258; 524/3

[56] References Cited

U.S. PATENT DOCUMENTS

| 3,454,455 | 9/1969 | Rasmussen | 156/513 |
| 3,728,211 | 4/1973 | Ball et al. | 106/99 |
| 3,934,421 | 1/1976 | Daimler et al. | 404/70 X |
| 4,230,762 | 10/1980 | Iwasaki et al. | 428/234 |
| 4,242,407 | 12/1980 | Bijen | 428/247 |
| 4,257,993 | 3/1981 | Schemel | 264/112 |
| 4,303,714 | 12/1981 | Mercer | 428/134 |
| 4,344,804 | 8/1982 | Bijen et al. | 106/99 |
| 4,345,001 | 8/1982 | Bijen | 428/286 |
| 4,346,135 | 8/1982 | Arnheiter et al. | 428/703 |
| 4,349,398 | 9/1982 | Kearns et al. | 427/140 |
| 4,481,242 | 11/1984 | Fletcher | 405/258 |

FOREIGN PATENT DOCUMENTS

| 421448 | 4/1971 | Australia . |
| 0002267 | 1/1978 | Fed. Rep. of Germany . |
| 2355787 | 5/1978 | France . |
| 3823784 | 11/1963 | Japan . |
| 54-23947 | 4/1975 | Japan . |
| 51-49134 | 12/1976 | Japan . |
| 592219 | 10/1977 | Switzerland . |
| 836555 | 10/1956 | United Kingdom . |
| 969655 | 12/1961 | United Kingdom . |
| 1069361 | 3/1964 | United Kingdom . |
| 1210354 | 11/1966 | United Kingdom . |
| 1250478 | 2/1968 | United Kingdom . |
| 1213428 | 4/1969 | United Kingdom . |
| 1415524 | 8/1972 | United Kingdom . |
| 1539898 | 2/1975 | United Kingdom . |
| 1506615 | 6/1976 | United Kingdom . |
| 2025841 | 6/1979 | United Kingdom . |
| 2034240 | 10/1979 | United Kingdom . |
| 2035191 | 10/1979 | United Kingdom . |
| 2073090 | 10/1981 | United Kingdom . |
| 2096531 | 10/1982 | United Kingdom . |
| 2108896 | 5/1983 | United Kingdom | 428/134 |

OTHER PUBLICATIONS

Hannant et al., "Polypropylene Film in Cement Based Materials" Apr. 1978, pp. 83–88.
Hannant et al., "Polyolefin Fibrous Networks in Cement Matrices for Low Cost Sheeting," 1980, pp. 591–597.
Hibbert et al., "Toughness of Cement Composites Containing Polypropylene Films Compared With Other Fibre Cements," Oct. 82, pp. 393–399.
Hoare, Renforcement des Sols, Mar. 1979, pp. 47–52.

Primary Examiner—Theodore Morris
Attorney, Agent, or Firm—Holman & Stern

[57] ABSTRACT

Pieces of strips of flexible, open plastics mesh structure are randomly embedded in a matrix without creating a substantial amount of extra void space in the matrix, to strengthen the matrix. Each piece or strip comprises more than one mesh opening, has tenacious junctions or intersections, has high dimensional stability in its plane, and has high flexural recovery. Relatively small, generally flat pieces can be used, or alternatively strips more than one hundred times as long as they are wide. In the case of soil, a special machine can be provided which cuts up a reel of continuous mesh structure and has a rotary digging tool which digs up the top layer of soil and mixes pieces with the soil.

27 Claims, 20 Drawing Figures

4,662,946

STRENGTHENING A MATRIX

This application is a continuation-in-part of my application Ser. No. 538,421, filed Oct. 3rd, 1983 now abandoned.

BACKGROUND OF THE INVENTION

The present invention relates to a method of strengthening a particulate matrix, comprising embedding pieces or strips of flexible, open mesh structure in the matrix. The word "strengthening" includes reinforcing and/or stabilizing.

In general terms the matrix can be any particulate matrix, whether load-bearing or not. The structures formed can be for instance geotechnical structures, structural components for building, or surfacing materials. The maxtrix can be of any suitable form, such as soil (which includes rocks, stones, gravels, sands, clays, silts and the like as well as cement-stabilised soil and cement-bound granular materials (normally containing 2–12% cement), wastes such as mine spoil or slag, and hydraulic fills), substances comprising a hydrocarbon binder such as asphalt, bituminous asphalt or tar, substances comprising a hydraulic binder or fill, such as cement, concrete, lean-mix concrete or plaster (which are considered as particulate), substances comprising a pozzolanic binder, and substances comprising a resinous binder, such as chip-board. The matrix can be particulate and non-cohesive or cohesive, or inherently substantially rigid; a material such as clay or tar may be viscous and capable of large movement or deformation, or a material such as cement or concrete can be rigid and incapable of large movement or deformation. particulate matrices will have natural void spaces which can be filled for instance with water and/or air.

GB No. 2 073 090A describes a method of strengthening soils in which long and fairly wide lengths of flexible plastics material mesh structure are embedded in the matrix, the lengths being in parallel layers and the lengths being parallel to each other in each layer so as to cover all of the layer. The mesh structure has tenaceous junctions or intersections and has high dimensional stability in the plane of the structure. This method is very effective in most applications, but does require skill and care in use, as well as requiring a specially manufactured mesh structure.

CH No. 592 219 discloses a method of strengthening cement, tar or bitumen, comprising randomly embedding in the matrix a large number of flexible pieces of plastics material mesh structure without creating a substantial amount of extra void space, each face of each piece having an area which is small relative to the size of the matrix, and each piece comprising more than one mesh opening. However, the pieces are initially supplied in the form of short, twisted cords which are arranged to open or untwist during mixing; mixing must be so timed that the cords have fully untwisted, but have not started to twist or otherwise close up again. It is believed that it would be very difficult to ensure that the cord untwists and opens up adequately, and very difficult to avoid any opened-up pieces closing up again—the pieces would have a tendency to roll up if there is any rolling motion during mixing (which normally occurs). In addition, it appears that the mesh structure is produced by forming parallel slits in plastics material film and then opening the film up by pulling it transversly, possibly with some heat setting. This structure would have little transverse strength, and would act as a very poor reinforcement.

An article on pages 47 to 52 in C. R. Coll. Int. Renforcement des Sols, paris 1979, discloses small strips for strengthening soil, but the strips do not give the optimum reinforcing effect as they have no significant transverse strength and would have a poor purchase on the soil.

GB No. 1 539 898 discloses the use of pieces of steel weld mesh to strengthen concrete, each piece having just one complete mesh. The pieces are relatively stiff and each has eight projecting wires, so that there will be a tendency to bridge and form extra void space.

In Ep No. 0 017 548A and in Volume III of the "proceedings of the Second International Conference on Geotextiles", pages 721 to 726, there is a disclosure of such a method, mainly in connection with strengthening soil. The preferred element is a highly flexible yarn, but a close-weave strip can alternatively be used. There is however a very poor interlock between the surface of the strip itself and the soil; it is believed that the primary strengthening effect is obtained by the looping round of the strip and engagement of the soil in this manner. The distribution of the strip also appears to be mainly in horizontal planes, with small radius curves in each plane (i.e. about vertical axes), giving poor anchoring of one layer into the layers above and below. Furthermore, the strip will tend to roll or to twist or condense into a rope-like shape, reducing the surface area available for engaging the soil and tending to create extra void space in the soil.

THE INVENTION

Principally, it has been discovered that if generally flat, flexible open mesh structure pieces have a combination of properties, and are randomly embedded in the matrix without creating a substantial amount of extra void space in the matrix, greatly improved strengthening can be achieved. The pieces should each have an area which is small relative to the size of the matrix, comprise more than one complete mesh opening, have tenaceous junctions or intersections. have high flexural recovery, and have high dimensional stability in its plane.

Specifically for embedding the pieces in the soil, the invention provides a soil-strengthening machine which has a support for the mesh structure, means for dividing the mesh structure into the pieces, and means for placing the pieces in the ground.

The invention also provides the strengthening material which is cut up to form the pieces. in the form of a plurality of rolls of long narrow strips of the flexible open mesh structure in coaxial, side-by-side relationship.

The pieces of mesh structure provide a positive interlock with the matrix, and thus do not rely entirely on friction between o chemical bonding between the material of the piece and the matrix. In other words, particles of the matrix in different mesh openings are interlocked together. In soil at least, the mesh pieces plus interlocked soil particles form aggregates of particles within the soil mass. Providing there are sufficient mesh pieces, these aggregates will interact so that the whole mass of soil will be interlocked into a single improved mass. The effectiveness of the pieces depends upon them having tenaceous junctions or intersections which enables each piece to interlock effectively with the matrix and properly exploit the strength of the material of the piece without the piece tearing apart. In addition, each piece has high dimensional stability in the plane of the piece, which enables the piece to withstand forces in its plane and maintain the stability of the matrix.

Usually asphalts are graded so as to contain particles from a predetermined maximum size down to a fine powder and it is believed that in matrices of the invention, the large particles are anchored by the mesh pieces and the smaller particles are anchored by the larger particles.

In general, the mesh structure pieces can be easy to manufacture, providing a cheap strengthening. The strengthening can be supplied in for instance compact rolls and be cut into the pieces immediately prior to mixing with the matrix.

The mixing of the pieces with the matrix is random (three-dimensional distribution in a random manner), and the mesh structure pieces would not in general be parallel to each other. Thus, in the specific case of plasterboard or concrete panels (or slabs), some pieces may extend in the direction at right angles to the faces as well as parallel to the faces, depending on the thickness of the panel; with thin panels (or sheets), the pieces would be more generally coplanar with the panel.

As each piece is small relative to the size of the matrix as a whole, and as the mixing is random, the pieces can be incorporated with ease in the matrix without advanced technology and without great skill even though there is a large number of the pieces. Nonetheless, it is surprisingly found that the pieces are highly effective in strengthening the matrix, provided no substantial amount of extra void space is created; for the purposes of this specification, the space occupied by the material of a mesh piece itself is not considered void space—it is desirable, though not essential, that the inclusion of the mesh pieces should no decrease the bulk density ot the matrix (plus pieces).

In general terms, the following are examples of the application of the method of the invention:
  soil strengthening. including stabilization;
  the replacement of asbestos in asbestos cement sheeting;
  general reinforcement of cement and concrete products;
  plasterboard reinforcement;
  chip-board reinforcement;
  asphalt reinforcement.

There is a particular advantage with soil. If the soil on site is of poor quality, it is often practice to remove the soil and bring in good quality particulate or granular material, i.e. non-cohesive material; if the mesh structure pieces are mixed with the existing soil, its quality is improved. The load-bearing capacity of the existing soil is increased, reducing the amount of fill required above the soil for e.g. road construction. When properly mixed in soil in the correct proportions, the mesh pieces will act by altering the soil matrix to form a relatively homogeneous mass with improved engineering behaviour, referred to as a soil stabilization technique. With optimum strengthening, the incorporation of the mesh pieces can be equivalent to an increase in the overall soil angle of friction of 2° or 3° or by a load spreading effect through the strengthened layer, resulting in an effective increase in the width of the footing. In addition, soil normally has no significant elastic recovery, soil strengthened with the pieces appears to have some elastic recovery and could be particularly useful for dynamically-loaded locations, such as sub-bases for runways, roads or railways. Furthermore, at high strain (i.e. after significant movement), the strengthened soil still has high load bearing capacity and does not heave.

If the matrix is rigid, as in the case of concrete or cement-stabilised soil or cement-bound granular materials, the pieces can limit movement if cracking occurs and provide some elastic recovery; for instance in cement-stabilised soil, one normally expects a large number of very small cracks to be formed.

It has also been discovered that the strengthening material can be a flexible strip of open mesh structure, over one hundred times as long as it is wide. The strip has tenaceous junctions or intersections, high flexural recovery and high dimensional stability in its plane. The strip is embedded randomly in the matrix without creating substantial extra void space.

The strip strengthens the matrix, providing a good and positive interlock generally as described above, the particles of the matrix penetrating into and through the open meshes of the strip. Thus the primary strengthening effect is within relarively short lengths of the strip, generally as discussed above in relation to the pieces. It was found in preliminary testing that the strip is mainly in large swirls, i.e., open loops as shown in FIGS. 11 and 12 with little creasing or crumpling and often a succeeding layer is at least partly above (and spaced above) a preceding layer; the 'runs' of the strip extend in all directions and are not aligned with or parallel to each other. This provides three-dimensional strengthening of the matrix. The speed of feed of the strip in relation to the rate of flow of the particulate material can be altered to provide good control of the configuration of the strip in situ as a feeding device is moved around (and also control of the weight percentage of strip included). The looping of the strip provides a secondary reinforcing effect, but this is believed to be much less than the primary effect referred to above. There is the additional advantage that there is greater anchorage into the body of the matrix in locations where e.g. water or wind erosion may have a significant effect. For reasons discussed below, no substantial extra void space is created in the matrix. The junctions or intersections are tenaceous and enable considerable tensile forces to be taken up by the strip.

The strip can be mixed with the matrix in any suitable Way. It is not necessary that fluid conveyance be used for the particulate material and/or for the strip. One way of mixing however is to introduce the strip into the particulate material while the particulate material is moving in loose form, e.g. gravity feed or fluid conveyed, when the masses of the material will be broken up to a large extent. The present invention is particularly applicable to strengthing a matrix formed by feeding a particulate material suspended in a fluid which can be water (the material is termed "hydraulic fill") or air. If a construction is formed by feeding suspended particulate material, there can be confinement in the construction itself in the form of a water-pervious wall or there may be no confinement at all. If the construction is confined, the cellular arrangement of GB No. 2 078 833 A can be used to provide water-pervious or apertured walls. Without confinement, the particulate material can assume an angle of repose greater than its normal angle of repose. As an instance of such constructions, an artificial shore line or an artificial island can be constructed by pumping sand from an adjacent location, e.g. dredged from the sea bed. Simultaneous feeding leads to a reasonable distribution of the strip, even for instance on the underwater sloping sides of artificial islands or shore lines.

In all cases, the transverse strands of the strip can cause good transportation and bedding of the strip in the sense that each layer is properly pushed down by the particulate material, which will tend to lie on top of the layer and separate that layer from the next layer. In the case of underwater constructions (e.g. forming artificial islands, reclaiming land or stabilizing river banks), the strip is carried well down below the surface by the particulate material, and there is less tendency for the particulate material to drop down below the strip as the strip descends.

THE PIECES—GENERAL

Material of Pieces

The preferred pieces are of integral plastics material mesh structure comprising molecularly orientated strands. Plastics material mesh structures are easy to manufacture and handle. In specific cases such as concrete cladding sheets, the resistance to corrosion is very beneficial. If the method of making the mesh structure is suitably chosen, there can be a large amount of orientation or all zones of each piece can be at least partly orientated or even highly orientated, avoiding wastage of plastics material and also maximizing the tensile strength and modulus of the pieces. In the normal case where the meshes are four-sided and four strands issue from each junction or intersection, the mesh structure is preferably stretched in two directions along the alignments of the strands. In practice, this can be done by sequential biaxial stretching, stretching first along the alignment of one set of strands and then along the alignment of the other set of strands; or alternatively by stretching a diamond mesh in a single direction, to stretch all the strands, opening the meshes up laterally, and heat setting the mesh. Biaxially orientated structures are preferred as it is easier to achieve dimensional stability.

In general terms, any suitable integral plastics material mesh structure can be used, for instance as disclosed in GB Nos. 836 555, 969 655, 1 210 354, 1 250 478, 2 034 240A or 2 035 191B; a deep strand structure such as that of GB No. 1 210 354 is very suitable because of better anchoring or interlock—the strands are non-circular, being deeper than they are wide.

In general terms, if a plastics material is used, preferred materials are high density polyethylene (HDPE), polypropylene (PP) or polyesters. HDPE or PP can be orientated to a degree corresponding to stretch ratios of 6:1 or more, preferably 10:1 or more; the stretch ratios for polyesters are less, for instance up to about 5:1. With e.g. asphalt reinforcement, where the pieces will be mixed with the hot asphalt, a suitable high temperature resistant plastics material, such as polyester, should be used; the mesh structure may have been heat-set at a temperature of up to for example 230° C.

Materials other than integral plastics material structures can be used, for instance non-metallic or organic-base materials such as resin-bonded open mesh woven structures, a preferred such structure being a Leno weave. For soils, the material should be non-biodegradable.

Other Strengthening

The invention can have significant advantages if used in conjunction with other strengthening in the form of elongate members which extend part way or substantially right through the matrix. Such elongate members may be as disclosed in GB B No. 1 069 361 (where the elongate members could alternatively be made of fibre-glass, for intance with a protective water-impermeable coating). GB Nos. 2 035 191B, 2 073 090B or 2 096 531A. The elongate members can be used not only in soil matrices, but also more generally, for instance in matrices comprising hydrocarbon, hydraulic or pozzolanic binders.

Tenaceous Junctions or Intersections

The junctions or intersections of the mesh must be tenaceous and should not rupture too easily under tensile forces, in whatever direction the forces are applied to the piece. This is because the pieces will mainly be distributed in the matrix in a multiplicity of directions, i.e. almost totally random. As the matrix is particulate, the effect of the pieces relies on interlock and this could cause splitting of the junctions or intersections even if tensile forces were applied along the axes of the strands, unless the junctions or intersections are tenaceous.

In general terms, the expression "tenaceous junctions or interesections" means that the junctions or intersections are not weak and can be stressed in any direction without rupturing too easily. Preferably, if opposed tensile forces are applied across the piece, in whatever direction, the strands rupture (break or split) before the junctions or intersections do so. It is however satisfactory if the tensile strength at break of the junctions or intersections in any direction across the piece and in the plane of the piece is not substantially less than 50% of the average tensile strength at break of the strands; i.e., in practical terms, it is found that the junction or intersection can be weaker than the strands and still perform in a satisfactory manner, though this is not preferred.

Isotropic Strength

As far as possible, isotropic strength is aimed for under opposed tensile forces in the plane of the piece. This means that the tensile strength at break in any direction across the piece is not substantially less than that in any other direction across the piece, whether break occurs in a strand or at a junction. It is however satisfactory if the tensile strength at break in any direction across the piece (and in the plane of the piece) is not substantially less than 50% of that in any other direction across the piece. In general terms, it is desirable to structure a square or rectangular mesh so that it has substantially equal strengths in the two directions in which the strands extend.

High Flexural Recovery

The mesh pieces will be generally flat prior to mixing or embedding, i.e. at the most just slightly curved due to the curvature of the roll from which they have been produced. The pieces will have some flexibility and will not normally lie perfectly flat when embedded in the matrix. However the pieces should be chosen in relation to the material of the matrix so that they do not create a substantial amount of extra void space in the matrix. It is found that the mesh pieces can fold over or wrap around to a certain extent during embedding or mixing; a single fold reduces the effective area of a piece, and thus is not desirable, but interlock between the material of the matrix and the pieces still occurs, and no substantial extra void space is created. It is believed that extra void space is created when there are too many layers of the same piece in contact with each other or very close to each other—two layers, as in the case of folded pieces, do not seem to have a pronounced effect. Nonetheless, tight "condensation" of the mesh pieces. e.g. rolling up, twisting up, balling up or crumpling up, does create extra void space; the tight condensation would impede the penetration of the material of the matrix into the mesh structure and would not achieve proper interlock between the pieces and the matrix; in addition, where a piece is for instance rolled up, there may be a substantial void space in the middle, into which the material of the matrix has difficulty in penetrating. It is therefore desirable to avoid having a substantial number or proportion of pieces which are tightly condensed.

The pieces should have sufficient flexural recovery for a high proportion of them not to become condensed during embedding or mixing, and this is termed "high flexural recovery" herein. The flexural recovery can be thought of in terms of the stiffness or springiness of the material of the piece, the material being capable of high bending before yielding. Though it is believed that flexural recovery and/or flexural stiffness are the underlying properties, the actual value of the flexural recovery or stiffness of the mesh pieces need not be taken as the determinative criterion; the length of the piece, the nature of the matrix and the method of embedding are important.

Various tests can be devised for determining if substantial extra void space would be created. For instance, the material may be chosen so that the piece can be bent through a predetermined angle without excessive plastic deformation, the test being carried out over a short period of time at the temperature of incorporation into the matrix. A suitable standardised flexural recovery test is as follows: four samples 40×100 mm are cut, one having its long sides parallel to one set of strands, and the others having their long sides at 45° in each direction and at 90° to those of the first sample. If only smaller specimens are available, the results can be estimated. With the samples horizontal, 60 mm of length are clamped adjacent an edge having a radius of 3 mm so that 40 mm project out over this edge. It is considered undesirable if the tip droops by a distance corresponding to an angle of greater than 3° measured along the chord of the drooping piece. The sample is then folded 90° down over the edge, held for five seconds, released, and after a further five seconds the angle to which it has reverted is read (again measured along the chord). The flexural recovery is the percentage of the original bend angle which is recovered, i.e. if the original droop is a° and the sample returns to a droop of b° (greater than a°), the flexural recovery is $100\times(90-b)/(90-a)\%$. In practice, it is found that, to the nearest degree, it is possible to obtain 100% recovery, but reasonable quality pieces have 95% recovery and it is preferred not to use pieces having a recovery of less than 75% or better 83%. The test can be carried out on specimens of a different size, but the size itself of the piece determines the tendency to, say, roll up during mixing, i.e. a larger piece will tend to roll up more easily.

For suitable soils, e.g. sands, a useful practical flexural recovery test is as follows. A sufficiently large sample of the strengthened soil is put into a compaction vessel and compacted to British Standard BS 5930-1981. After compaction, a further 100 mm of the same soil without the mesh pieces is added to cover the surface of the compacted mixture. The sample is then transferred in the vessel to a heated oven where it remains for a time and at a temperature suitable to dry out the sand and heat set the mesh pieces in the form they have taken up during mixing and compaction. After cooling, the mixture is tipped from the vessel onto a metal grid which is then vibrated until substantially all the soil has passed through the grid, leaving the heat-set mesh pieces available for examination. Substantially no mesh pieces should exhibit any substantial degree of rolling, balling, twisting or crumpling. A like test can be carried out for concrete or cement composites, the cement merely being omitted or possibly replaced with very fine sand.

If a convenient strengthened soil sample is required for laboratory work, it can be prepared as follows. Pieces of the mesh structure are progressively added by tumble mixing to a well graded sand (for example, Mid-Ross Sand), which sand contains a percentage moisture content which will ensure ease of mixing—the moisture content can be determined empirically. The mixing is continued until the required percentage of inclusion has been reached. Mixing should then be continued for a further one minute.

High Dimensional Stability

High primary dimensional stability in the plane of the piece means that there is considerable resistance to elongation when tensile forces are applied across the piece in a direction parallel to a set of strands; this is important. High secondary dimensional stability means that there is considerable resistance to the meshes closing up during mixing, particularly when tensile forces are applied across the diagonals of the meshes. If the meshes did close up on mixing, the entry of the matrix material into the meshes would be restricted. It may be important that there is good recovery of the original mesh shape after distortion.

A useful measure of secondary dimensional stability relates the "distortion load" to the weight of the piece per unit area. The distortion load is that tensile force which, when applied across any diagonal of the meshes, reduces the area of the mesh opening by half (related to its unloaded area). Generally, the distortion load:weight per square meter ratio may be as low as 0.5:1, 0.6:1 or 0.75:1 (ratios below 0.5:1 not being preferred but not being excluded), though preferred minimum values are 1:1, 1.5:1, 2:1, 3:1 or 3.5:1.

The test should be carried out in the diagonal directions. Normally, if the secondary stability is sufficiently high, the primary stability will be sufficiently high and need not be separately tested. The test above can be applied for instance to pieces having very elongate rectangular meshes or having square or nearly square meshes.

A simpler calculation can be made for square or nearly square meshes if a modified distortion load is considered as that which reduces the opposite diagonal dimension by half—a rather smaller load need be applied, and the relative decreases differ because the different mesh sizes and weights change the stiffness. The modified distortion load:weight per square meter ratio is preferably at least 0.6:1 and may be at least 0.8:1 or 1:1, though minimum values of 2:1 or 2.5:1 or more can be realised with some materials.

Density

The relative density of the material of the pieces of mesh structure may be important, depending on the method of mixing and the consistency of the matrix for instance before setting or consolidation. The pieces should remain distributed randomly throughout the matrix, i.e. should not all tend to rise to the top or sink to the bottom.

Tensile Modulus

The effective tensile modulus of the piece should ideally be similar to that of the matrix if the matrix is rigid, using high modulus structures for matrices such as concrete; however, the invention is still beneficial if the modulus is lower. Low modulus structures can be used for matrices such as soil.

Proportion of Pieces to Matrix

In any matrix there will be a large number of pieces. For any particular matrix and mesh piece, there will be an optimum number of pieces per unit volume to obtain maximum improvement of properties; this can be determined experimentally. The proportion of pieces used will depend upon inter alia the nature of the matrix, particle size distribution in the matrix, strand size, mesh pitch, overall size and shape of pieces, and flexural stiffness and tensile stiffness of the mesh pieces. If the amount of mesh pieces is too great, the mesh pieces will grossly interfere with each other (and may fold) and the matrix/piece interlock action will be suppressed reducing the strength of the matrix—thus inadequate strength of the individual pieces cannot be compensated for by using a very large amount of the pieces. Nonetheless, there may be so many pieces per unit volume that without the matrix present, the pieces would provide a self-supporting mass of about the same volume—if, as is normal, strands protrude from the edges of the pieces, the mass can be coherent to a certain extent as protruding strands or even the corner of one piece can engage in the mesh opening of another piece; the effect occurred particularly when using larger mesh pitches. The effect was specifically noted when pieces of 18 mm pitch mesh having just four complete mesh openings (2×2) were used at 0.5% w/w (dry weight) to strengthen sand.

It is believed that a preferred minimum is about 5,000 or 10,000 pieces per cubic metre and a preferred maximum is about 500,000 pieces per cubic meter, though the number depends inter alia on the size of the pieces.

In general, the proportion w/w of the pieces to the matrix is preferably from about one tenth of that proportion at which the matrix has maximum density to about two and a half times that proportion. All proportions are given herein for dry weight. For soil, the proportion is preferably less than about 2% or 1% but preferably more than about 0.05%. For hydrocarbon, hydraulic and pozzolanic binder products, the proportion is preferably as for soil, or may be up to 5%.

Number of Mesh Openings in a Piece

Preferably, each piece has up to a thousand, five hundred or two hundred and fifty complete mesh openings, the more preferred number being about twenty-five or twenty but for instance eight or nine being possible. It is also possible to operate with pieces having as few as three or four complete mesh openings.

Size of Pieces

Each face of a piece will have an area which is small relative to the size of the matrix being strengthened. The greatest dimension of the piece would be small relative to the greatest dimension of the matrix, e.g. less than one tenth or one hundredth or one thousandth of the matrix greatest dimension. As long as the mesh structure pieces have small widths, they can be quite long, for instance up to 300, 400 or 500 mm long, or even longer. Nonetheless, it is preferred that the pieces be roughly square or at least that the length be of the same order as the breadth, e.g. not more than ten times the breadth and more preferably not more than twice the breadth.

When strengthening soil, the area of each face of the pieces is preferably about 10,000 mm$^2$ or less, the preferred area being about 1,000 mm$^2$, for instance 35 mm square or 30×40 mm. If however the pieces are long and relatively narrow, each face can have sizes significantly greater than 10,000 mm$^2$, for instance up to 20,000 or 30,000 mm$^2$.

For hydrocarbon binder products, the size of the pieces can be rather larger than for soil, e.g. about 20,000 mm$^2$ or less.

For hydraulic or pozzolanic binder products, the size of the pieces can be as for soil, though much smaller pieces, say down to about 100 mm$^2$ (area of each face) are conceivable; the mesh size may depend on the size of the aggregate or filler, but for instance for cement roofing sheets, the pieces may be much smaller than for soil strengthening.

Mesh Size and Strand Thickness

It is easier to consider pitch than mesh size. The pitch may be chosen in relation to the particle size of the matrix. For soil particle sizes, one normally considers the D85 value, which is the grid size through which 85% w/w of the soil passes. It is preferred that the pitch should be substantially greater than the particle size, a preferred maximum being 25 times particle size and a preferred minimum being twice particle size. In general for strengthening those soils and granular materials which are normally used, the pitch may be between 5 and 40 mm. For fine sand having a 1 mm D85 value, the pieces can have a roughly square pitch of about 3 mm and a strand thickness of for instance about 0.1 mm. For hydrocarbon, hydraulic and pozzolanic binder products having a maximum particle size of 20 mm, the pieces can have a roughly square pitch of about 50 mm with a strand thickness of for instance about 2 mm.

The Strips—General

The following features can be exactly as described above in relation to the pieces:
other strengthening, with elongate members;
tenaceous junctions or intersections;
tensile modulus;
proportion by weight of the strips (i.e. the pieces) to the matrix;

Material of the Strips

This can be exactly as described above in relation to the pieces. However, as transverse interlock may be important. e.g. for applying good traction to the strip when feeding with a fluid-conveyed or gravity-fed stream of particulate material, just the transverse strands can be deep strands. The longitudinal strands can be highly orientated (e.g. up to 12:1 or more for polypropylene (PP) or high density polyethylene) and the transverse strands less highly orientated or non-orientated as found suitable. In situ, a deep strand structure (in one or two directions) creates a good interlock and abutment with rhe particulate material.

It is preferable that the strips have longitudinal strands—the other strands of the mesh structure would normally be roughly at right angles to the longitudinal strands, though this need not be so in all circumstances. For instance, the structures of FIG. 2b of GB No. 2 034 240 B or of FIG. 22b of Ep No. 0 062 462 Al could be used if the strands are much wider than they are thick and the material is sufficiently flexible to give reasonable transverse dimensional stability.

The strips have open meshes, and at least 50% of their face area is open. The open meshes reduce the tendency for slip planes to form in the matrix and give better interlock.

Size of Strips

In all cases the strip will be thin relative to its width, i.e. much wider than it is thick; for instance. the strip may have a width at least 10 times its thickness and preferably at least 20 times its thickness, the thickness being as measured from the tops of the strands on one face to the tops of the strands on the other face.

In general terms, the strip will be more than one or two hundred times as long as it is wide. The length would normally be greater than a hundred meters and lengths of hundreds of meters, e.g. more than 500 or 1000 meters, can be used. For large constructions, the strip could be up to half a meter wide or one meter wide and e.g. two Km long; such a strip could be used for instance for constructing an island for supporting an oil rig in ten meters or twenty meters of water with a top diameter of a hundred meters. The strip could be longer than the maximum dimension of the matrix and one face of the strip could have an area greater than say the plan area of the matrix.

In general, it is believed desirable that each strip should be longer than the distance from the point from which the strip is fed to the zone of the matrix into which the strip will be anchored, and as a practical measure in underwater construction, longer than the distance from the feed point to the bed of the e.g. river, canal, lake or sea.

Number of Mesh Openings in a Strip

The strip may have just one complete mesh opening across its width, particularly if the strip has relatively large meshes, e.g. meshes 15 mm wide. However, the strip preferably has a plurality of complete mesh openings across its width, especially if the mesh opening widths are smaller, e.g. at 4 or 6 mm pitch; particularly with small mesh opening widths, it is difficult to cut a mesh structure into single mesh openin widths. A preferred maximum for most applications is ten or twenty complete mesh openings across the width of the strip.

Mesh Size and Strand Thickness

These can be as described above in relation to the pieces. The mesh opening sizes will depend to a certain extent upon the particle size of the particulate material. To give an instance, for fine silt, a square pitch (strand pitch) of 10 mm or down to e.g. 4 or 6 mm could be used. say with a strip width of 60 mm.

As explained under "Flexural Recovery" below, the transverse strand thickness may be greater than that of the axial (i.e. longitudinal) strands.

Isotropic Strength

In general terms, this can be as described above in relation to the pieces and the strengths can be as specified above. However, the axial strength could be substantially greater than the transverse strength and the strengths in other directions are not so important.

High Flexural Recovery

In general terms, this can be as described above in relation to the pieces. Axial flexural stiffness is desirable to avoid significant creasing or crumpling in situ. Transverse flexural stiffness is desirable to avoid rolling, twisting or condensing into a rope-like shape in situ; to assist this, the mesh structure may have substantially greater transverse flexural stiffness than longitudinal flexural stiffness (even if biaxially orientated)—this can be achieved by the transverse strand being deeper than the longitudinal strands or just of greater cross-sectional area than the longitudinal strands.

Flexibility

In theory, the strips need only have axial flexibility though in practice they would be expected to have transverse flexibility.

High Dimensional Stability

This can be as described above in relation to the pieces. However, in general this need only be considered in the axial and transverse directions, and the axial dimensional stability can be much greater than the transverse dimensional stability provided there is sufficient transverse dimensional stability to prevent excessive opening up, e.g. generally as defined in relation to the distortion load test given above but carried out transversely instead of on the diagonals and considering the axial length reduction.

Density

In general terms, this can be as described above in relation to the pieces. However, if hydraulic fill is being used, it may be preferred to use a denser plastics material such as polyamide or polyester (both having a density greater than 1 gm/cm$^3$).

THE DRAWINGS

The invention will be further described, by way of example, with reference to the accompanying drawings, in which.

FIGS. 1a TO 1e

Figure 1A:
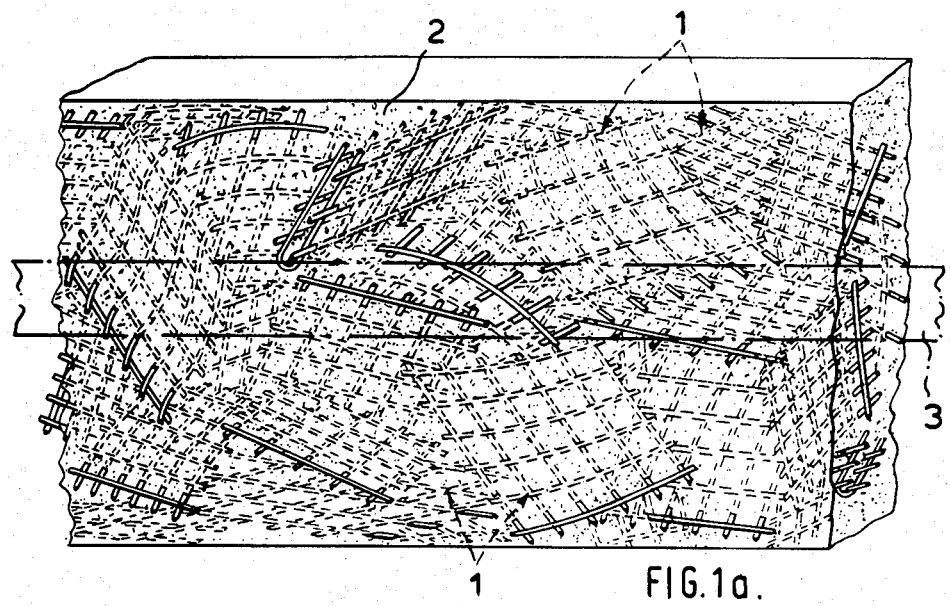
FIG. 1a is a schematic slice through a matrix strengthened in accordance with the invention.

FIG. 1a shows pieces 1 of integral plastics material mesh structure, mixed randomly with a matrix 2. The slice shown will have a finite thickness, e.g. one tenth of the height of the panel or layer, all the pieces 1 (or parts thereof) within the slice being depicted in dashed lines—for clarity, the pieces 1 are not shown cut off at the edges of the slice and projecting parts are shown in full lines. If desired, continuous, elongate strengthening or reinforcing members 3 can be incorporated in the matrix 2.

Figure 1B:
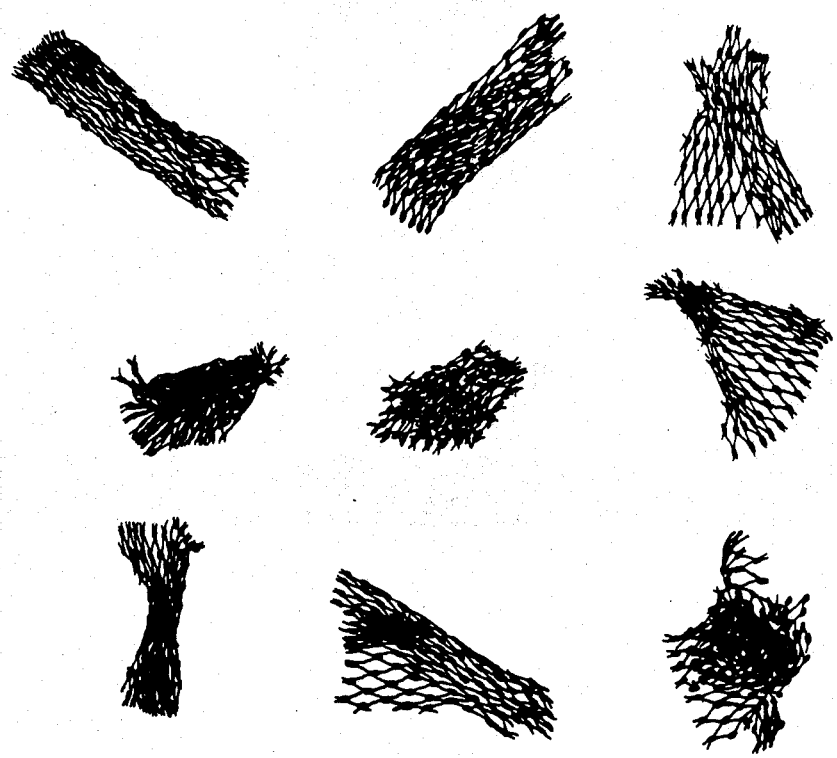
FIG. 1b illustrates mesh pieces which are not in accordance with the invention.
Figure 1C:
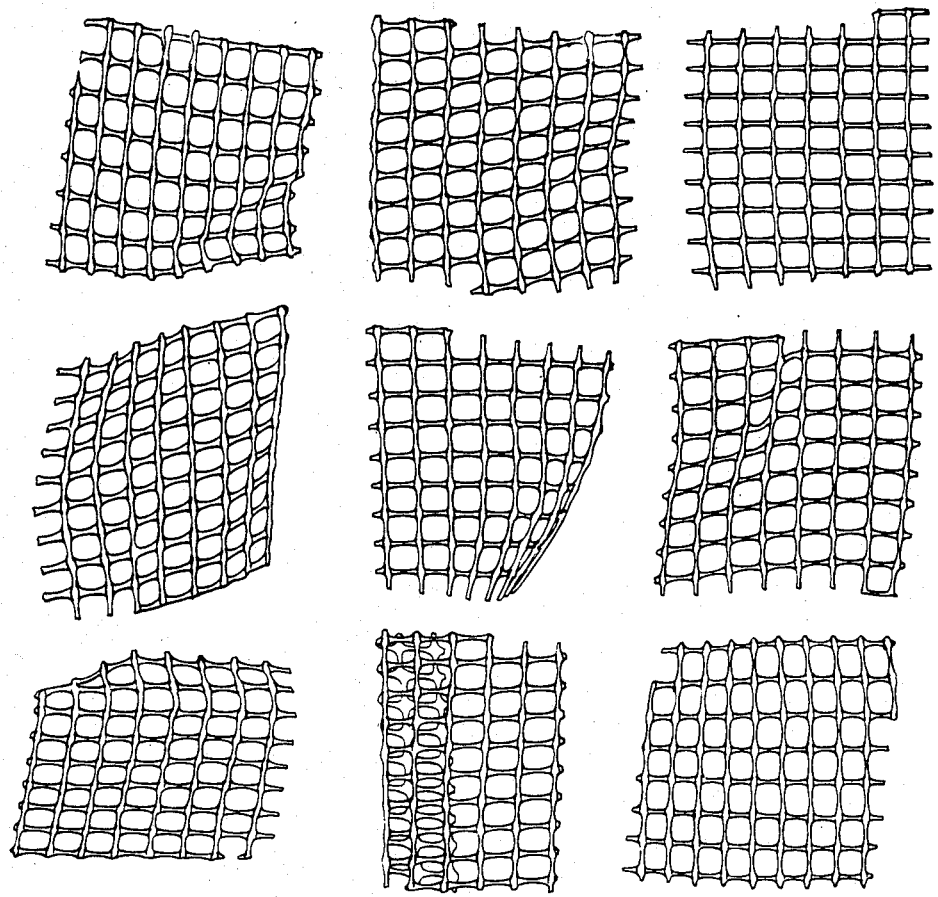
FIG. 1c illustrates mesh pieces which are in accordance with the invention.

FIGS. 1b and 1c illustrate samples of mesh pieces recovered after mixing and compacting in said practical flexural recovery test described above. FIG. 1b illustrates the result of using unsuitable mesh pieces which met the requirements of the test in only one direction. FIG. 1c illustrates the result of using suitable mesh pieces (Example 4 of Table 1 below).

Figure 1D:
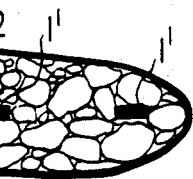
FIGS. 1d and 1e are schematic, theoretical figures illustrating the behaviour of the strengthened matrix.
Figure 1E:
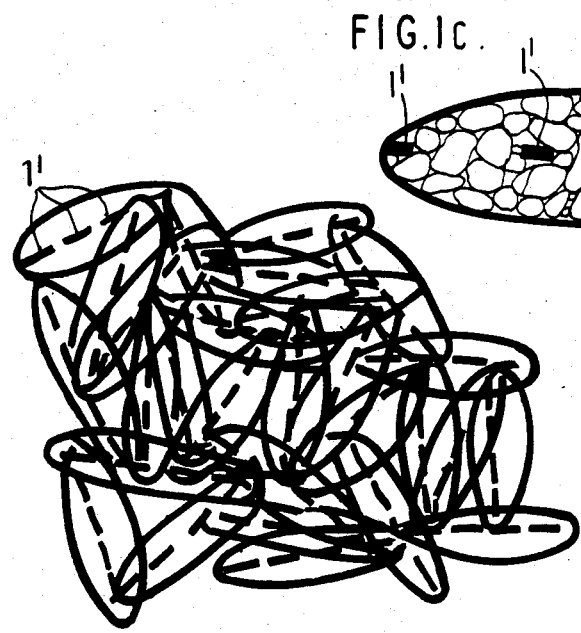

FIG. 1d shows a theoretical interlocked soil assemblage, with soil particles 2' interlocked by the filaments 1' of a single piece 1. FIG. 1e shows interlocked assemblages in the soil mass.

Figure 2:
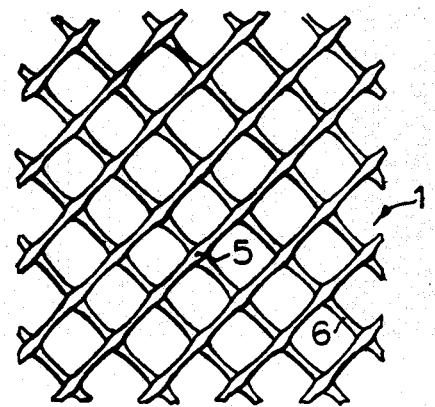
FIGS. 2 to 4 are views of three different pieces of mesh structure used in accordance with the invention.
Figure 3:
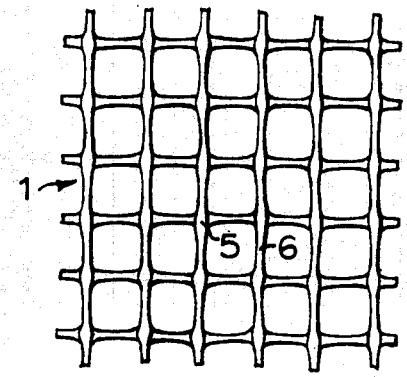
Figure 4:
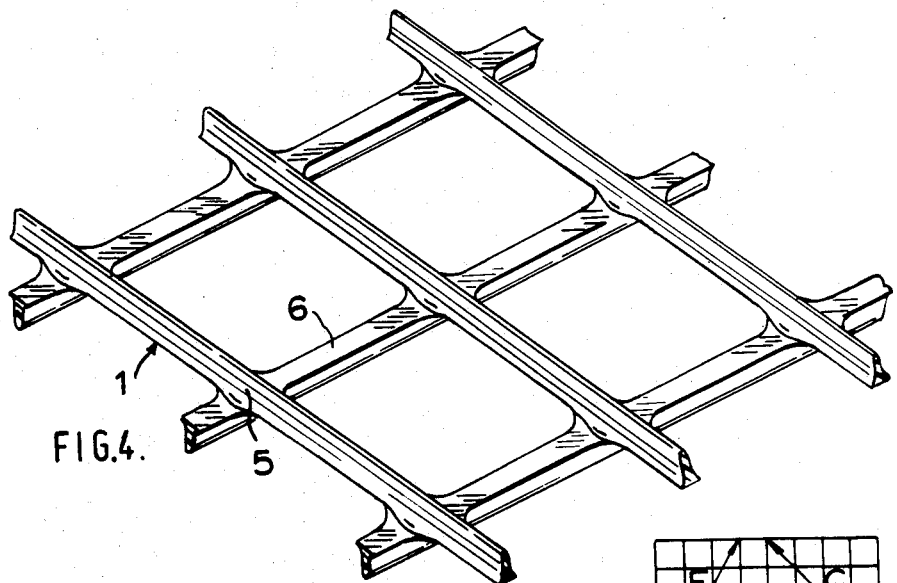

FIGS. 2 to 4

The piece 1 of FIG. 2 was a heat-set, orientated biplanar diamond mesh structure of GB No. 836 555. The piece 1 of FIG. 3 was a heat-set biplanar biaxially-orientated square mesh structure of GB No. 1 250 478. FIGS. 2 and 3 illustrate that the pieces can be "on the diamond" or "on the square". The piece 1 of FIG. 4 was a deep strand structure as disclosed in GB No. 1 210 354. In each of FIGS. 2 to 4, there are intersections or junctions 5 interconnected by highly orientated strands 6; in FIGS. 2 and 3, the intersections 5 are unorientated whereas in FIG. 4, some orientation has occurred in the intersections 5.

FIG. 5

Various mesh structures were subjected to "hook tests" to determine their tensile strengths in various directions across the structure. Tables 1 and 2 below give the results. Each of the mesh structures were biaxially orientated, having been stretched roughly to the same stretch ratio in each of two directions at 90°; the strands were highly orientated. Mesh structures 1 to 3 were as in FIG. 3 and had been stretched 4.5:1 overall. The orientation passed into the intersections, though there was some unorientated material in each intersection. Mesh structures 4 to 6 were biplanar mesh structures produced by the method of GB No. 969 655 and stretched 4:1 overall. Mesh structure 7 was as in FIG. 4, and had been stretched 6:1 overall. without heat-setting. Mesh structure 8 was as in FIG. 3, and had been stretched 4:1 overall and heat-set at 185° C.

Figure 5:
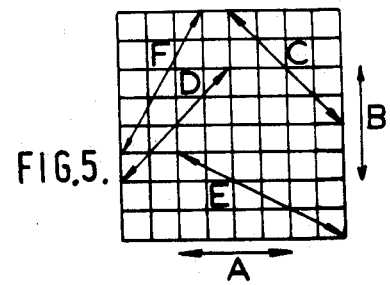
FIG. 5 is a diagram showing the tensile forces applied to a piece when testing the piece.

As illustrated in FIG. 5, the forces were applied in four or six different directions A to D or A to F, two being along the respective strands and two being along the respective diagonals. These directions were chosen because the maximum strength and the minimum strength should be represented, at least approximately. Tables 1 and 2 give the strengths at peak load together with some details of the material. In no case did the junction or intersection break. In each case, the minimum force at break was greater than 50% of the maximum. The extension at peak load for A and B is given in Table 2 as a percentaqe (as an average for mesh structures 1 to 3). The thinnest part of any strand was roughly at its mid-point.

Table 2 also gives the distortion load and the modified distortion load as a ratio to the weight per unit meter of the mesh structure. As the meshes were square and the structures balanced, the ratios for loads on respective diagonals were very close to each other—Table 1 gives the average. In all cases, the mesh structures had high primary dimensional stability. In all cases, the materials passed said practical flexural recovery test (mesh structure 4 is illustrated in FIG. 1c).

Mesh structures 7 and 8 were not available and were not tested, their unit weights being estimated. It is believed that they would comply with the dimensional stability and flexural recovery tests.

TABLE 1

| Mesh structure | Material | Unit wt gm/m$^2$ | Mesh Pitch mm | | Strand Thickness (mid-point) mm | |
|---|---|---|---|---|---|---|
| | | | Direction A | Direction B | Direction A | Direction B |
| 1 | HDPE | 38.2 | 6.0 | 6.0 | 0.25 | 0.24 |
| 2 | HDPE | 14.5 | 6.0 | 6.0 | 0.25 | 0.21 |
| 3 | PP | 17.4 | 6.0 | 6.0 | 0.23 | 0.19 |
| 4 | PP | 40 | 4.3 | 5.1 | 0.39 | 0.20 |
| 5 | PP | 18.5 | 6.2 | 7.2 | 0.24 | 0.17 |
| 6 | PP | 15.4 | 3.3 | 3.5 | 0.07 | 0.17 |
| 7 | PP | 60 | 10.0 | 10.0 | * | * |
| 8 | Polyester | 150 | 20.0 | 20.0 | 1.2 | 1.2 |

*strand width 0.3 mm, strand height 2 mm, averaged for each direction.

TABLE 2

| Mesh structure | Hook Break Load (Peak Load Kg) | | | | | | Ratio of Max to Min Break Load | % Extension to Peak Load | |
|---|---|---|---|---|---|---|---|---|---|
| | A | B | C | D | E | F | | | |
| 1 | 1.44 | 1.40 | 1.65 | 1.74 | 1.66 | 1.72 | 1.24:1 | 27 | |
| 2 | 0.98 | 1.04 | 1.37 | 1.30 | 1.16 | 1.23 | 1.40:1 | 25 | |
| 3 | 1.38 | 1.18 | 1.67 | 1.52 | 1.50 | 1.60 | 1.42:1 | 15 | |
| 4 | 1.47 | 1.88 | 1.50 | 1.29 | — | — | 1.46:1 | 55 | 35 |
| 5 | 1.26 | 1.53 | 0.87 | 1.34 | — | — | 1.76:1 | 66 | 25 |
| 6 | 0.59 | 0.51 | 0.38 | 0.35 | — | — | 1.69:1 | 55 | 100 |

TABLE 3

| Mesh Structure | Distortion Load Ratio (to 50% open area) | Modified Distortion Load Ratio (to 50% diagonal Dimension) |
| --- | --- | --- |
| 1 | 3.7:1 | 2.61:1 |
| 2 | 4.2:1 | 2.35:1 |
| 3 | 5.3:1 | 4.98:1 |
| 4 | 6.5:1 | — |
| 5 | 4.0:1 | — |
| 6 | 6.5:1 | — |

TABLE 4

| Ex | Mesh Structure | Average size of mesh pieces mm | Average no of mesh openings | content % w/w | Area in m² per m³ of soil |
| --- | --- | --- | --- | --- | --- |
| 1 | 4 | 40 × 40 | 63 | 0.64 | 290 |
| 2 | 5 | 40 × 40 | 30 | 0.31 | 303 |
| 3 | 5 | 40 × 40 | 131 | 0.10 | 98 |
| 4 | 6 | 40 × 40 | 121 | 0.30 | 353 |

TABLE 5

| Example | CBR % Top | CBR % Bottom |
| --- | --- | --- |
| 1 | 11.0 | 21.5 |
| 2 | 7.0 | 12.5 |
| 3 | 5.8 | 7.5 |
| 4 | 4.5 | 11.0 |

Figure 6A:
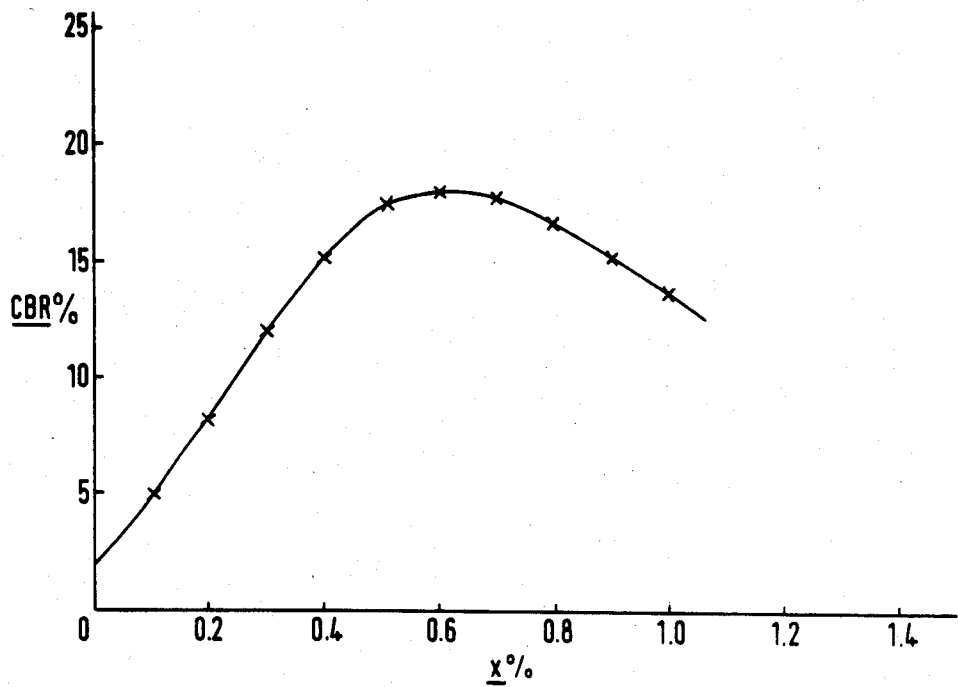
FIGS. 6a and 6b are graphs of bearing ratio and dry density against mesh piece content.
Figure 6B:
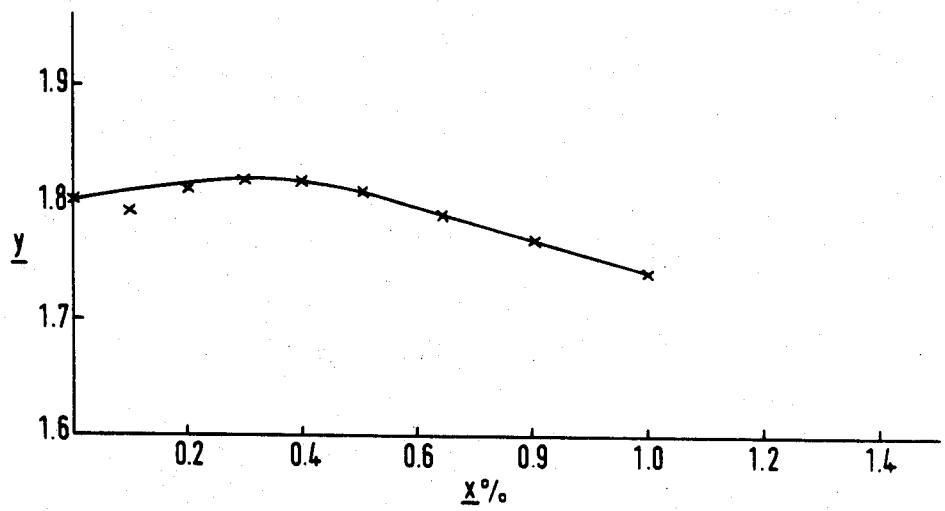
Figure 6C:
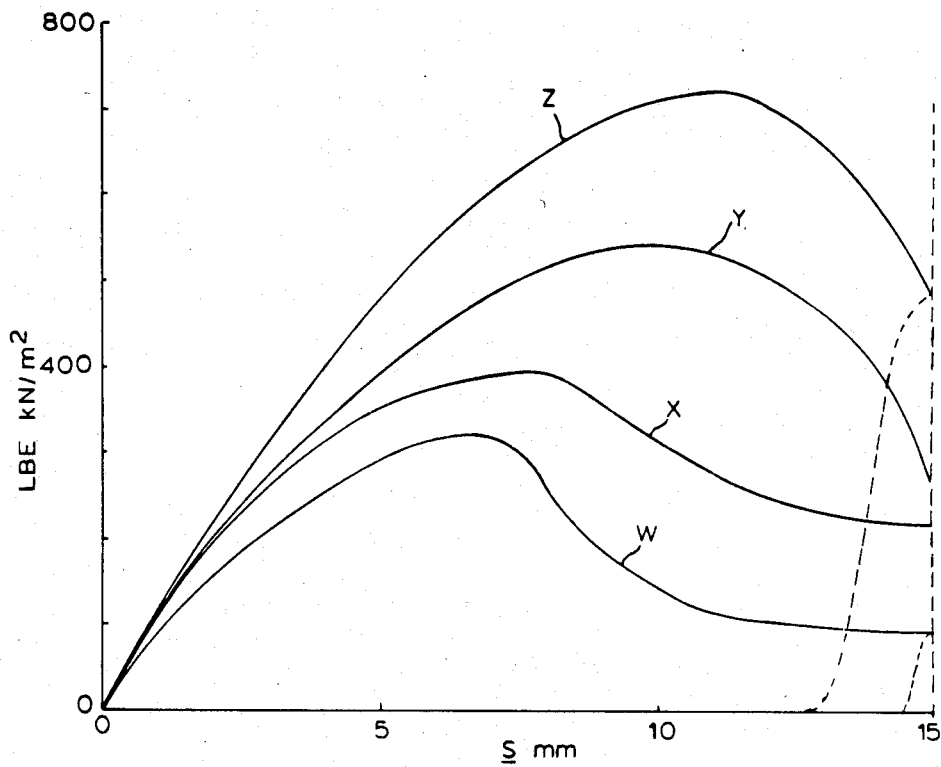
FIG. 6c is a graph of load bearing capacity against strain.

FIGS. 6a to 6c

FIG. 6a illustrates the variation of the average (top and bottom) CBR value of a Mid-Ross Sand with 9.3% w/w moisture content (believed slightly above optimum), as the content of the mesh pieces (x) is altered (the content is given as % w/w of dry sand). FIG. 6b shows how the dry density of the mixture (y) in tonnes per m³ alters with the w/w content of the mesh pieces (x); the density initially rises because the pieces occupy some of the void space. The mesh pieces were 40×40 mm squares of mesh structure 4, above (as in Example 4 of Tables 4 and 5 below). The mixture was compacted in accordance with BS No. 5930-1981, and the bearing strength was measured in accordance with the CBR standard test.

The maximum in FIG. 6a is at about 0.65% (though it extends roughly from 0.5% to 0.7%) and that in FIG. 6b is about 0.32%. Thus the maximum strength occurred at a proportion of pieces which was roughly double that which gave maximum density. The inclusion of the optimum amount of the mesh pieces increased the CBR value to a value over eight times the original value. However it may be economical to reduce the inclusion of mesh pieces—for instance the CBR value is more than doubled at 0.1% w/w, compared to unstrengthened sand.

FIG. 6c shows the variation of stress or load bearing capacity (in KN/m²) against strain s (expressed as movement in mm) when Mid-Ross Sand with 9.3% moisture content, placed 170 mm deep in a 500 mm long×75 mm wide×500 mm deep tank is compressed by a square section 75×75 mm plate moving vertically downwards. Curve W is for sand alone; curves X, Y and Z are as for curve W but with the top 37.5, 75 mm and 150 mm respectively replaced by sand mixed with 0.1% w/w mesh pieces as for FIGS. 6a and 6b.

When the maximum load bearing capacity is exceeded, sand moves sideways and heaves up around the plate. It will be seen that the incorporation of the mesh pieces not only increases the maximum load bearing capacity, but also causing it to occur at greater strains.

The graph also shows in dashed lines the reversion as the plate is unloaded from the point of maximum load bearing capacity. In the case of sand alone (W), there is minimal recovery or elasticity. In the case of the strengthened sand (Z), there is significant recovery or elasticity.

Tables 4 and 5 below give the data for the optimum CBR values, using mesh structures 4 to 6 to strengthen a Mid-Ross Sand with 9.3% w/w moisture content.

Though Table 4 refers to square-shaped pieces, they could be elongate. Specifically, as an example for strengthening soil, the pieces of Examples 1 to 4 could have a length of 400 mm and a width of 40 mm.

The following Examples are theoretical. Some details are collated in Table 6 below.

Example 5 (strengthening soil)

Using the machine of FIG. 8 below, a mass of soil (which could be from 5 m³ up to $5 \times 10^8$ m³) is strengthened. The soil was Mid-Ross Sand having a D85 value of 1.7 mm and a dry density of 2000 Kg/m³ (moisture content was 9.3% w/w).

Examples 6 to 9 (strengthening soil)

Example 6 is as for Example 5, but a lower proportion of 4esh pieces is used. Examples 7 to 9 use a lighter mesh structure (in this case the mesh structure 6 had a unit weight of 15.0).

Example 10 (strengthening concrete)

A 1000×500×50 mm concrete slab was formed by mixing in a conventional mixer a graded aggregate with a maximum size of 10 mm, sand, Portland cement and the pieces of Example 8 in the proportions (dry weight) 1250:370:240:6.7 (the pieces Were 0.3% of the total dry weight); 180 parts water were also added. The slab would still be in a usable state even if it contained a large number of cracks because of a large number of mesh pieces bridge the cracks. It would be possible to use smaller mesh pieces. Though the mesh structure 8 was heat-set, heat-setting is unnecessary for use in cement. In this Example (as also in Example 11), the presence of particles in the aggregate which are large relative say to sand enable a normal mesh structure to be used; however, it would be possible to use a deep strand structure as in FIG. 4.

Example 11 (strengthening asphalt)

10 mm maximum particle size gap-graded aggregate was mixed with the pieces in an asphalt mixing machine, and the mixture was mixed with asphalt at 170° C. The asphalt was applied to a road surface as a wearing course 50 mm thick (and at least 10 m long and 3 m wide). The asphalt would show less rutting in a wheel tracking test than unstrengthened asphalt.

TABLE 6

| Ex | Mesh structure | Unit wt gm/$^2$ | Average size of mesh pieces mm | Average no of mesh openings per piece (calculated) | Content % w/w (dry) | Area in m$^2$ per m$^3$ matrix | Pieces per m$^3$ (nearest thousand) |
| --- | --- | --- | --- | --- | --- | --- | --- |
| 5 | 7 | 60 | 45 × 45 | 16 | 0.2 | 67 | 33000 |
| 6 | 7 | 60 | 45 × 45 | 16 | 0.1 | 33 | 16000 |
| 7 | 6 | 15 | 40 × 40 | 121 | 0.1 | 136 | 85000 |
| 8 | 6 | 15 | 40 × 40 | 121 | 0.5 | 680 | 425000 |
| 9 | 6 | 15 | 100 × 100 | 809 | 0.1 | 136 | 14000 |
| 10 | 8 | 150 | 60 × 60 | 4 | 0.3 | 48 | 13000 |
| 11 | 8 | 150 | 60 × 60 | 4 | 0.5 | 77 | 21000 |

Figure 7:
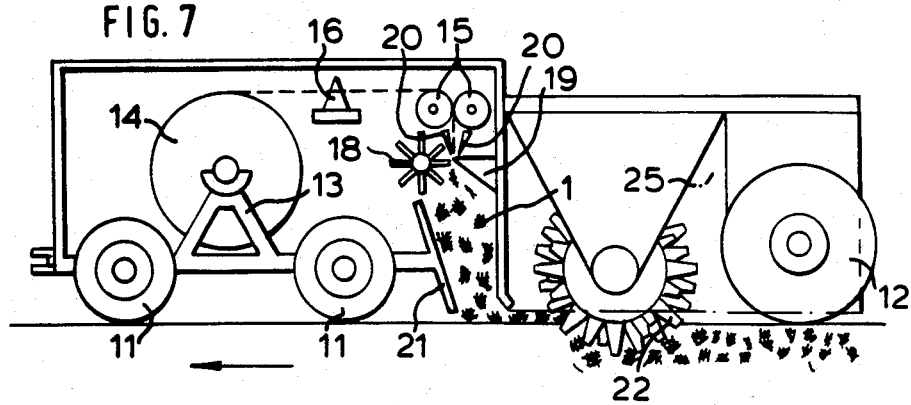
FIGS. 7 and 8 are schematic side elevations of first and second soil strengthening machines in accordance with the invention.
Figure 8:
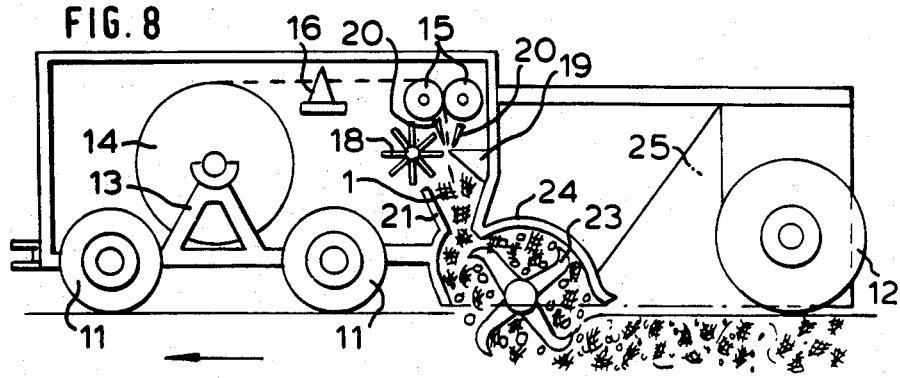
Figure 9:
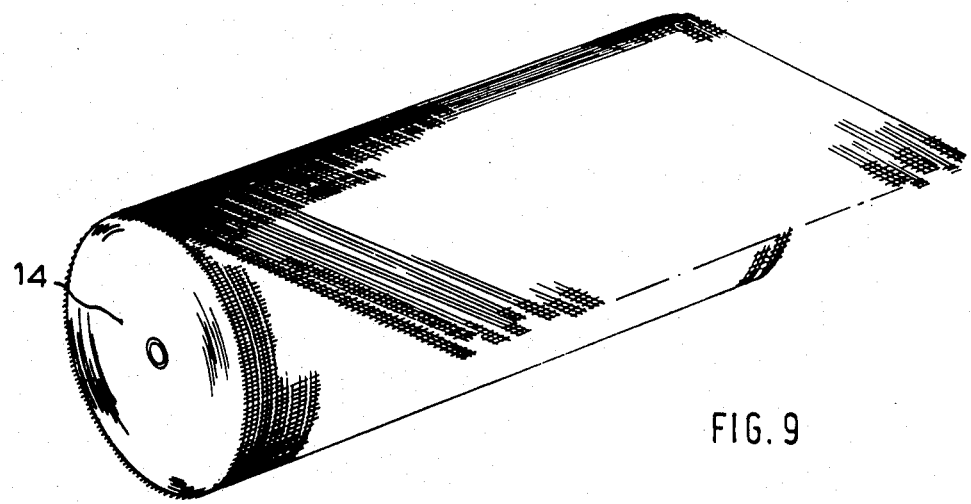
FIG. 9 is an isometric projection of a roll of mesh structure material which can be used in the machine of FIGS. 7 and 8.

FIGS. 7 to 9

FIGS. 7 and 8 show two similar machines, and the same references are used for the same or like parts. Each machine is in the form of a vehicle or trailer. Each machine has running wheels 11 and a compaction roller 12. Each machine has a support 13 for an e.g. one meter diameter roll 14 of mesh structure which can be for instance two meters wide. As the machine travels along, the mesh structure is hauled off by haul-off rolls 15, is divided into strips (say up to fifty strips) by longitudinal slitting knives 16 and is divided into pieces 1 by a rotary cutter 18 which co-operates with a ledger bar 19 below inclined guides 20; as an alternative, the roll 14 could be pre-slit into ribbon-like long narrow strips, as shown in FIG. 9, each strip having at least two complete mesh openings across its width. The pieces 1 are guided down by a funnel 21. As the pieces 1 could stick in the funnel 21, a blower (not shown) may be incorporated to blow the pieces 1 down the funnel 21.

In the machine of FIG. 7, there is a rotary multiple tine tool 22 for placing or pushing the pieces 1 in or into the ground. The individual tines are of different lengths and can have for instance a tip cross-section of 15×15 to 35×35 mm, being smooth truncated cones. There can be about five thousand tines on the tool 22.

In the machine of FIG. 8, the means for placing the pieces 1 in the ground is in the form of a rotary tool 23 for digging up the top layer of soil. There is a shroud 24 which guides the thrown up soil to the bottom of the funnel 21, where the loose soil is mixed with the pieces 1.

Both machines can be provided with side curtains 25 to reduce the possibility of wind disturbance of the pieces 1.

The machines are towed (or pushed) in the direction of the arrow. Once the pieces 1 have been placed in the ground, the ground is compacted by the roller 12.

FIG. 10

Figure 10:
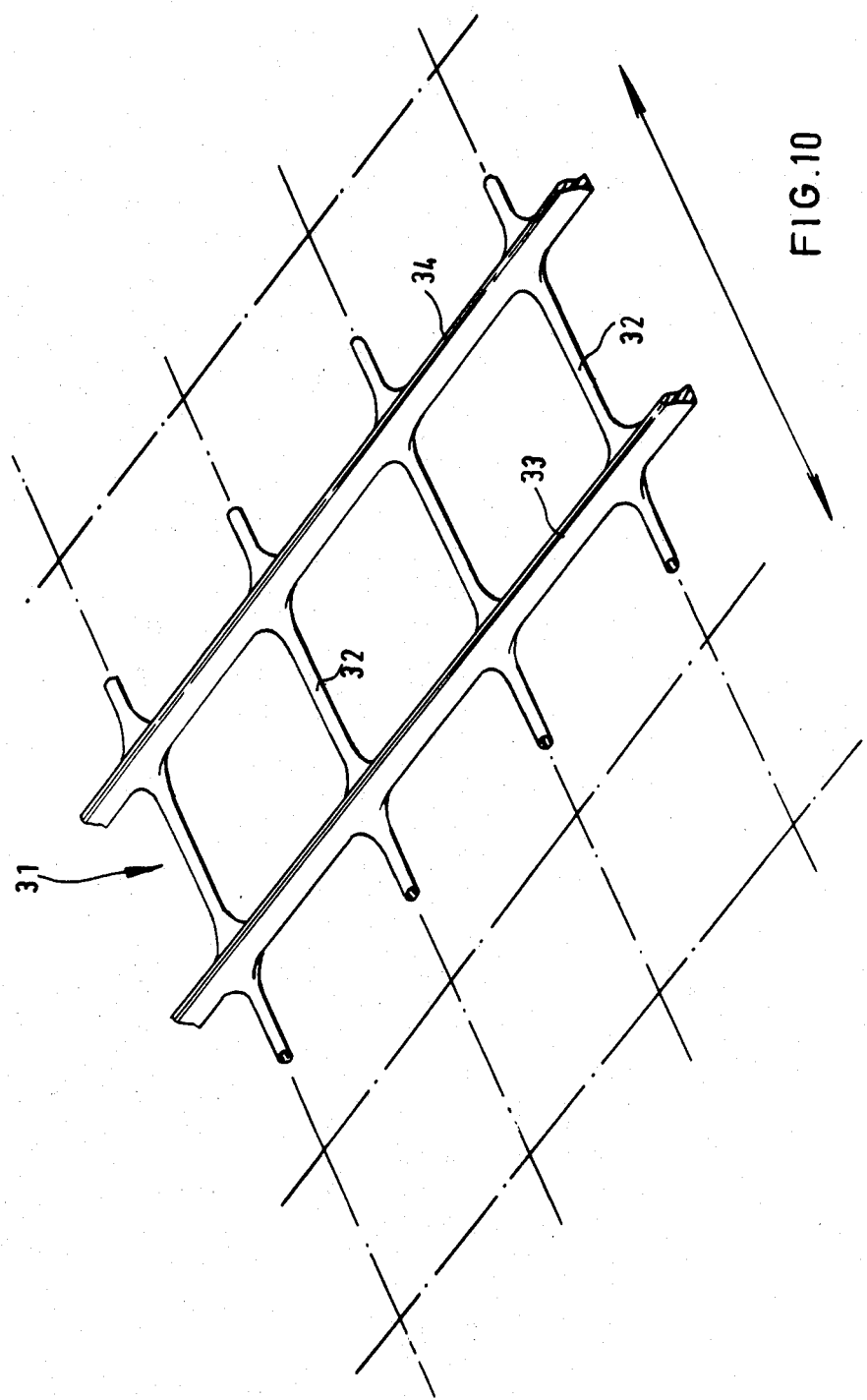
FIG. 10 is an isometric projection of part of a strip in accordance with the invention.

FIG. 10 illustrates a part of an open mesh strip 31 (which may be termed a ribbon) having highly orientated, roughly circular cross-section longitudinal strands 32 and non-orientated or low-orientated, non-circular, deep-section transverse strands 33. The strip 31 extends in the direction of the double-headed arrow. The strip 31 is formed of plastics material as indicated in Table 7 below.

Figure 11:
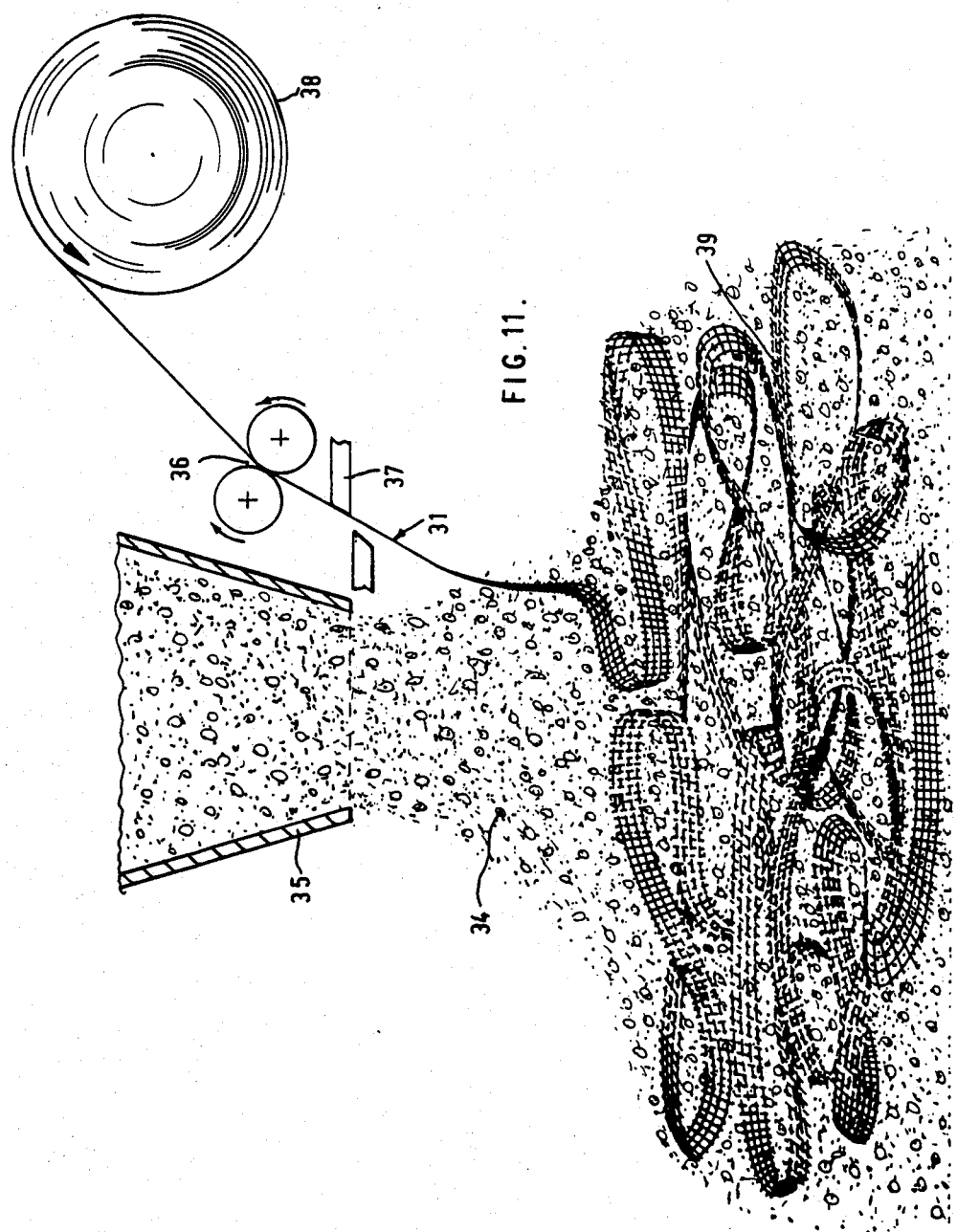
FIG. 11 is a schematic section, showing a method using strips.
Figure 12:
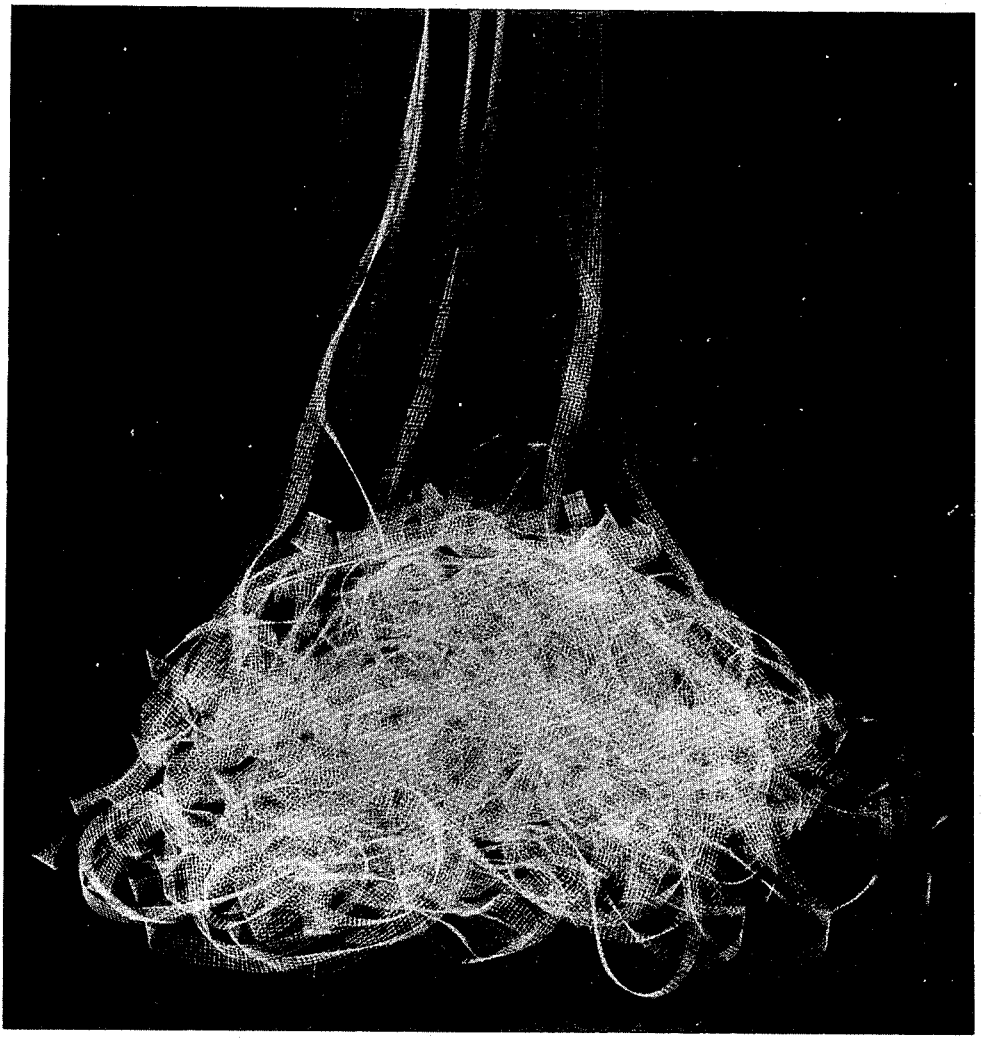
FIG. 12 is a photograph, taken horizontally, showing the strips of the invention as they would be in a matrix.

FIGS. 11 and 12

In the simple arrangement shown in FIG. 11, a particulate material 34, such as broken-up earth or mine spoil, is fed by gravity from a feeding device such as a funnel 35 simultaneously with a strip 31; the feeding device can be moved around horizontally to spread the material 34 or the feeding device may be the end of a stationary conveyor for a mine dump. The strip 31 can be as in FIG. 10 or can for instance be structured as in FIG. 4 (see Table 7 below). Though the transport of the strip 31 is assisted by the engagement of its transverse strands with the falling material 34, the strip 31 may be fed through nip rolls 36 to give a positive, controlled feed. In general terms, although there is positioning of the strip 31 by means of the feeding device or by means of the rolls 36, the embedding of the strip 31 is uncontrolled and random. The strip 31 could possibly be cut into lengths by a chopper blade 37. The strip 31 comes from a reel 38, and the length on the reel 38 can be very great; with a reel 38 of two meters diameter, the length on the reel 38 could be thousands of meters. The strip 31 is much longer than the distance from the point from which the strip 31 is fed (the nip rolls 36) to the zone of the matrix 39 into which the strip 31 becomes anchored. The strips 31 themselves can be wound in side-by-side reels, generally as disclosed in FIG. 9 above, for instance into thirty side-by-side reels, a plurality of strips 31 being fed at the same time.

It can be seen from FIG. 11 that the strip 31 becomes randomly embedded in the matrix 39 which is formed. The strip 31 is mainly in large swirls, i.e., open loops as shown in FIGS. 11 and 12 with no or little creasing or crumpling and often a succeeding layer is at least partly above (and spaced above) a preceding layer, the "runs" of the strip 31 extending in all directions and not in general being aligned with or parallel to each other—the non-alignment is shown rather better in FIG. 12. where ten strips 31 are shown fed simultaneously (each being five or six complete mesh openings wide). Mostly, the strips 31 lie generally uncrumpled in the matrix 39.

It would be expected that the strip 31 shown in FIG. 11 would be about 0.2% w/w of the matrix 39. Measuring the area of one face of the strip 31, there could be 30 to 60 m$^2$ of strips 31 per cubic meter of matrix. If the particulate material is soil. it can be "dry", i.e. with just its normal moisture content (which can for instance be up to 10% for sand).

FIG. 13

Figure 13:
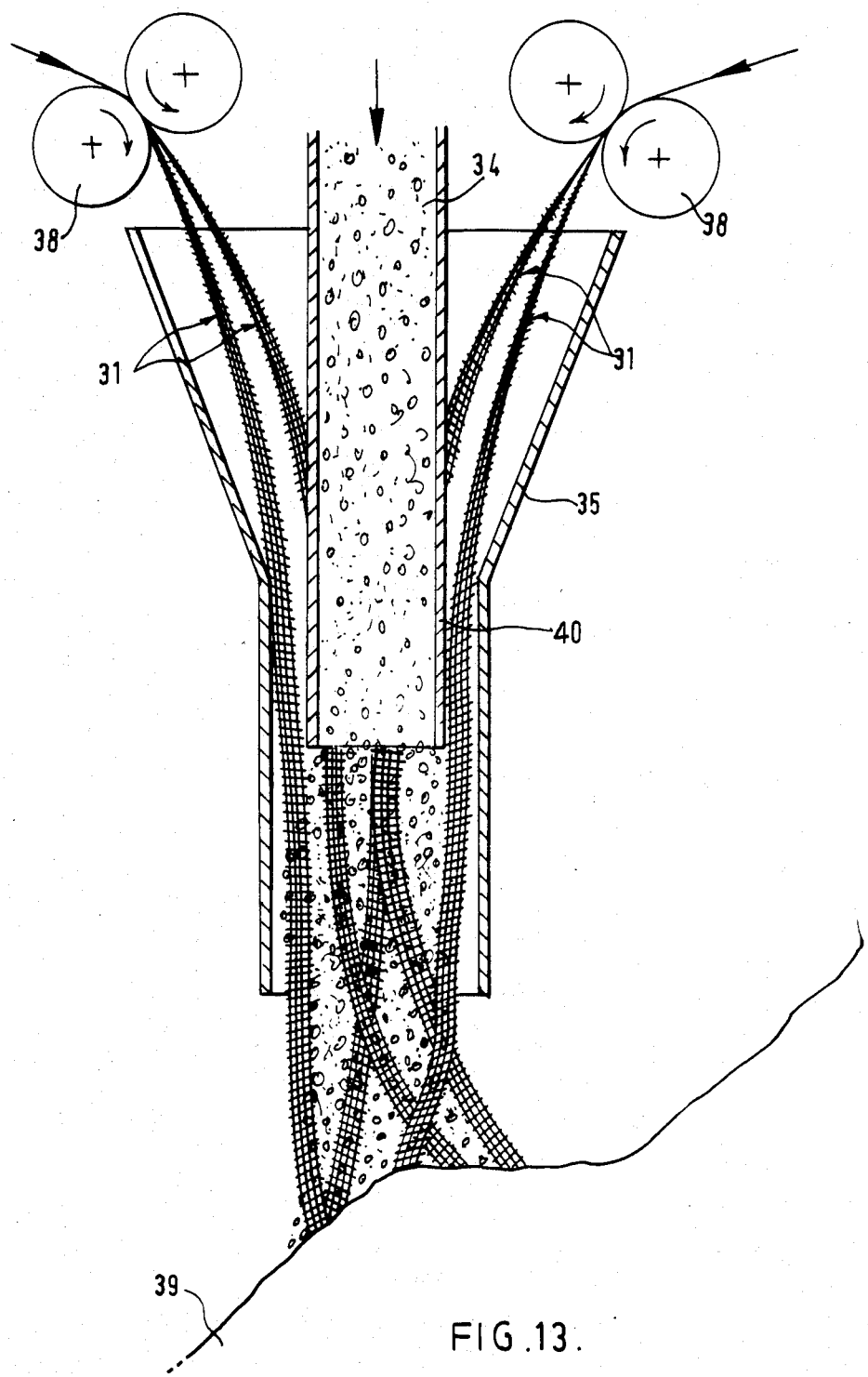
FIG. 13 is a schematic section, showing another method using strips.

FIG. 13 shows the reconstruction of a river bank 39 using dredged sand 34 which is ejected through a spout 40. The arrangment is similar to that of FIG. 11. except that strips 31 pass down through the inside of the funnel or cowl 35, which forms a Venturi; the reduced pressure assists in the transport of the strips 31, though this is also assisted by the engagement of the sand 34 with the transverse strands 33 of the strips 31.

The spout 40 may have a diameter of 70 or 100 cm, and is moved around (together with the cowl 35) as the sand 34 is ejected. The sand 34 will slide down the slope, beneath the water, dragging the strips 31 down with it, partly due to the engagement of the sand 34 with the transverse strands 33.

Though not shown, the strips 31 in FIG. 13 will lie in the matrix 39 in the same way as is shown for the strips 31 in FIGS. 11 and 12.

EXAMPLES OF STRIPS

Table 7 below gives examples of four different strips that can be used. The test below indicates a use of the strips, on a laboratory scale.

TABLE 7

(average values are given)

| Mesh No. | Type of orientation | Raw Matl. | Unit Weight gms/m² | Mesh Pitch mm Axial | Mesh Pitch mm Trans | Mid-point Strand Thickness mm Axial In plane | Mid-point Strand Thickness mm Axial 90° to plane | Mid-point Strand Thickness mm Transverse In plane | Mid-point Strand Thickness mm Transverse 90° to plane | Peak Strength KN/m Axial | Peak Strength KN/m Trans | % Extension to Peak Load Axial | % Extension to Peak Load Trans | Width mm |
|---|---|---|---|---|---|---|---|---|---|---|---|---|---|---|
| 1 | Biaxial | PP | 52 | 6.0 | 7.1 | 0.5 | 0.5 | 0.4 | 0.4 | 3.55 | 3.8 | 24 | 18 | 42.5 |
| 2 | Biaxial | PP | 42 | 11.0 | 14.0 | 0.3 | 1.0 | 0.3 | 1.0 | 3.5 | 4.5 | 25 | 20 | 56 |
| 3 | Uniaxial | PP | 230 | 12.0 | 3.3 | 0.3 | 1.0 | 0.5 | 2.3 | 19.0 | 2.8 | 20 | 16 | 40 |
| 4 | Biaxial | PP | 40 | 11.0 | 14.0 | 0.5 | 0.5 | 0.3 | 1.0 | 3.55 | 4.5 | 24 | 20 | 56 |

All the meshes were made from a square cast mesh. Mesh No. 2 is the biaxially orientated version of Mesh No. 3, and is as shown in FIG. 4 above. Mesh No. 4 is shown in FIG. 10. Peak strength testing was done with clamps—apart from Mesh No. 3, it corresponds to the break load. All the strips can be manufactured and used in 1 Km lengths.

Test

Figure 14:
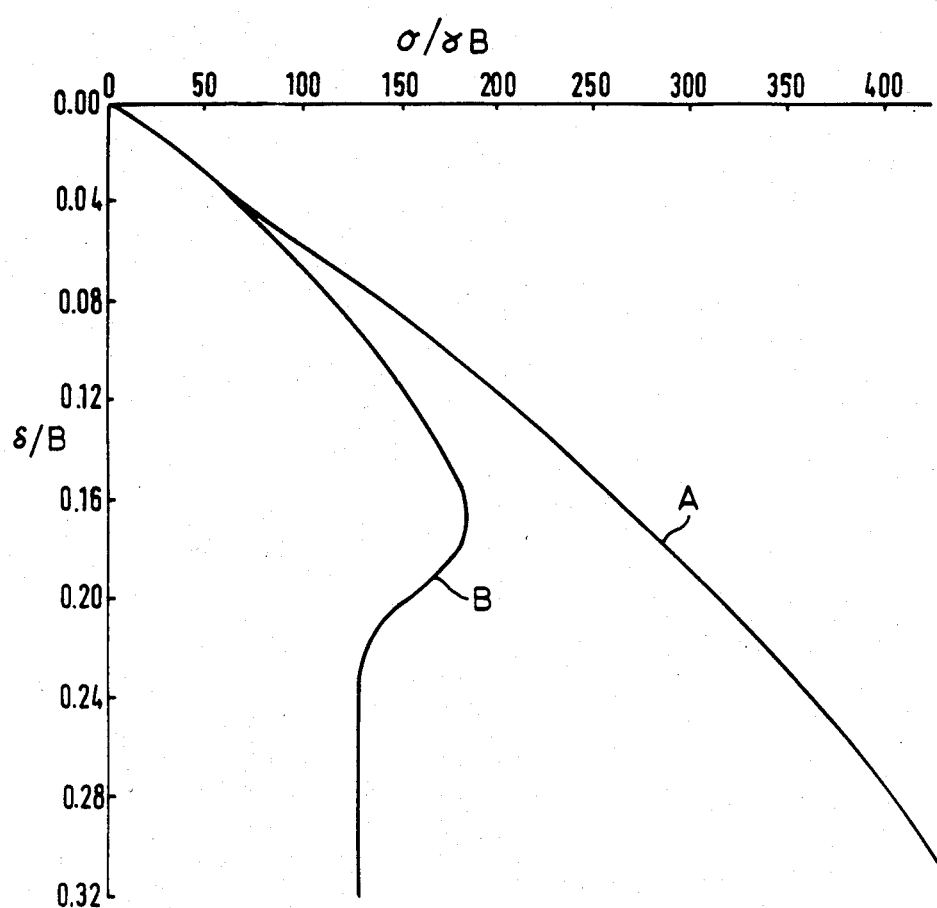
FIG. 14 shows load settlement curves.

The test equipment includes a glass sided tank 2.0 m long ×0.3 m wide ×1.14 m deep with an overhead pressure foot 0.3 m long ×0.12 m wide. The foot is positioned centrally with its longer dimension extending transversely of the tank. The tank was filled with Leighton Buzzard sand using a traversing sand shower to ensure a constant sand density throughout the depth of the tank. For the test with the mesh strip inclusions, strips of mesh No. 1 of Table 7 were randomly included in the upper part of the tank to a depth twice the width of the pressure foot, i.e. 0.24 m. The reinforced part of the sand contained 0.2% by weight of strips. The rate of penetration of the foot was 10.25 mm/hr. The data from the test is given in dimensionless form with the foot settlement ($\delta$) divided by its width (B) and the applied load divided by the area of the foot to give applied stress ($\sigma$), which is in turn divided by the unit weight of the soil ($\gamma$) multiplied by the width of the foot. The test was repeated using sand alone and the results are compared in Table 8 and graphically in FIG. 14 (curve A is sand plus strip and curve B is sand alone). FIG. 14 clearly shows not only an improved performance at low strains, but also a continuing improvement far beyond the peak performance of the sand alone. Table 8 quantifies the improvement as a ratio.

TABLE 8

| $\delta/B$ | $\sigma/\gamma B$ Sand alone | $\sigma/\gamma B$ Sand + Mesh | Improvement Ratio |
|---|---|---|---|
| 0.17 | 184 | 283 | 1.54 |
| 0.24 | 129 | 366 | 2.84 |
| 0.32 | 129 | 440 | 3.41 |

I claim:

1. A method of strengthening a particulate matrix comprising randomly embedding in said matrix at least five thousand generally flat pieces of flexible, open mesh structure per cubic meter of said matrix without creating a substantial amount of extra void space in said matrix, each said piece having a size from about 100 mm² to about 30,000 mm², the mesh structure being formed by two sets of strands, the strands in any one set extending substantially parallel to each other and the strands of one set extending substantially at right angles to the strands of the other set, thereby defining four-sided mesh openings, and the strands of one set being connected to the strands of the other set at tenaceous junctions or intersections, each said piece having an area which is smaller relative to the size of said matrix, comprising more than one complete said mesh opening having high flexural recovery, and having high dimensional stability in its plane.

2. The method of claim 1, wherein the mesh structure is an integral plastics material mesh structure comprising molecularly-oriented strands.

3. The method of claim 1, wherein the strands of the mesh structure are non-circular, having a greater dimension at right angles to the plane of the piece than the dimension in the plane of the piece.

4. The method of claim 1, wherein there are at least ten thousand of the pieces per cubic meter of matrix.

5. The method of claim 1 wherein, as measured in the plane of the piece, the tensile strength at break in any direction across the piece is not substantially less than 50% of that in any other direction across the piece.

6. The method of claim 1, wherein the area of said mesh opening is reduced to half by a tensile force when applied across any diagonal of a mesh opening of the piece, said tensile force being equal to at least 50% of the weight of the piece per square meter.

7. The method of claim 6 wherein the tensile force is equal to at least 60% of the weight of the piece per square meter.

8. The method of claim 1, wherein the pieces have a flexural recovery of at least 83% as determined by the standardised flexural recovery test.

9. The method of claim 1, wherein the pieces have a flexural recovery of at least 75% as determined by the standardised flexural recovery test.

10. The method of claim 1, wherein each piece contains not more than one thousand complete mesh openings.

11. The method of claim 1, wherein each panel is substantially square.

12. The method of claim 1, wherein the matrix is soil.

13. The method of claim 12, wherein the pieces are about 0.05% to about 2% of the matrix by dry weight.

14. The method of claim 12, wherein the pieces are about 0.05% to about 1% of the matrix by dry weight.

15. The method of claim 13 wherein the pieces are about 0.2% or more of the matrix by dry weight.

16. The method of claim 1, wherin the matrix has a hydrocarbon binder.

17. The method of claim 16, wherein the pieces are about 0.05% to about 5% of the matrix by dry weight.

18. The method of claim 16, wherein the pieces are about 0.05% to about 1% of the matrix by dry weight.

19. The method of claim 1, wherein the matrix has a hydraulic or pozzolanic binder.

20. The method of claim 19, wherein the pieces are about 0.05% to about 5% of the matrix by dry weight.

21. The method of claim 19, wherein the pieces are about 0.05% to about 1% of the matrix by dry weight.

22. A method of strengthening a particulate matrix, comprising randomly embedding in said matrix 5000 to 500000 pieces per cubic meter of generally flat, open mesh, plastics material structure without creating a substantial amount of extra void space in said matrix, each said piece having a size of from about 100 mm$^2$ to about 30,000 mm$^2$ the mesh structures being formed by two sets of orientated strands, the strands in any one set extending substantially parallel to each other and the strands of one set extending substantially at right angles to the strands of the other set, thereby defining four-sided mesh openings, and the strands of one set being connected to the strands of the other set at tenaceous junctions or intersections, each said piece having a greatest dimension which is less than one tenth of the greatest dimension of the matrix, each said piece comprising a plurality of complete said mesh openings, the tensile strength at break of said junctions or intersections in any direction in the plane of each said piece being not less than 50% of the average tensile strength at break of said strands, the tensile strength at break in any direction across each said piece not being substantially less than 50% of the tensile strength at break in any other direction across said piece, each said piece having a recovery of 75% or more in the standardized flexural recovery test, and each said piece having a ratio of distortion load to the weight of said piece per square meter of 0.5:1 or greater, said distortion load being that tensile force, which, when applied across any diagonal of said mesh openings óf said piece, reduces the area of the respective said mesh opening by half, related to its unloaded area.

23. A method of strengthening soil, comprising randomly embedding in said soil about 0.05 to 2% by dry weight and at least 5000 generally flat pieces of flexible, open mesh plastics material structure per cubic meter of said soil without creating a substantial amount of extra void space in said soil, the mesh structure being formed by two sets of strands, the strands in any one set extending substantially parallel to each other and the strands of one set extending substantially at right angles to the strands of the other set, thereby defining four-sided mesh openings, and the strands of one set being connected to the strands of the other set at tenaceous junctions or intersections, each face of each said piece having an area of from about 100 mm$^2$ to about 30,000 mm$^2$, and each said piece comprising a plurality of complete mesh openings having high flexural recovery, and having high dimensional stability in its plane, said mesh structure having a mesh pitch of about 2 to 25 times the D85 value of said matrix.

24. A method of strengthening a particulate matrix bound by a hydraulic or pozzolanic binder, comprising randomly embedding in said matrix about 0.05 to 5% by dry weight and at least 5000 generally flat pieces of flexible, integral, open mesh plastics material structure per cubic meter of said matrix without creating a substantial amount of extra void space in said matrix, the mesh structure being formed by two sets of strands, the strands in any one set extending substantially parallel to each other and the strands of one set extending substantially at right angles to the strands of the other set, thereby defining four-sided mesh openings, and the strands of one one set being connected to the strands of the other set at tenaceous junctions or intersections, each face of said piece having an areas of from about 100 mm$^2$ to about 10,000 mm$^2$ and each said piece comprising a plurality of mesh openings having high flexural recovery, and having high dimensional stability in its plane, said mesh structure having a mesh pitch of about 2 to 25 times the maximum particle size of said matrix.

25. A method of strengthening a layer of particulate matrix bound by an asphaltic, bituminous or tar binder, comprising randomly embedding in said matrix about 0.05% to 5% by dry weight and at least 5000 generally flat pieces of flexible, open mesh, integral plastics material structure per cubic meter of said matrix without creating a substantial amount of extra void space in said matrix, the mesh structure being formed by two sets of strands, the strands in any one set extending substantially parallel to each other and the strands of one set extending substantially at right angles to the strands of the other set, thereby defining four-sided mesh openings, and the strands of one set being connected to the strands of the other set at tenaceous junctions or intersection, each face of said piece having an area of from about 100 mm$^2$ to about 30,000 mm$^2$ and each piece comprising more than one mesh opening having high flexural recovery, and having high dimensional stability in its plane, said mesh structure having a mesh pitch of about 2 to 25 times the maximum particle size of said matrix.

26. The product of the process of claim 1.

27. The product of the process of claim 24.

* * * * *

UNITED STATES PATENT AND TRADEMARK OFFICE
CERTIFICATE OF CORRECTION

PATENT NO. : 4,662,946
DATED : May 5, 1987
INVENTOR(S) : Frank B. Mercer It is certified that error appears in the above-identified patent and that said Letters Patent is hereby corrected as shown below:

Column 1, line 34, cancel "particulate" and insert --Particulate--.

Column 2, line 57, cancel "o" and insert --or--.

Column 3, line 36, cancel "no" and insert --not--.

Column 3, line 40, after "strengthening" insert --,--.

Column 3, line 65, after "recovery" cancel "," and insert --;--.

Claim 1, column 20, line 25, after "mesh opening" insert --,--.

Claim 23, column 22, line 5, after "mesh openings" insert --,--.

Claim 24, column 22, line 25, after "mesh openings" insert --,--.

Claim 25, column 22, line 46, after "mesh opening" insert --,--.

Signed and Sealed this

Fourteenth Day of May, 1991

*Attest:*

HARRY F. MANBECK, JR.

*Attesting Officer*

*Commissioner of Patents and Trademarks*